July 2, 1963  M. J. GLAUBER  3,095,905
DIAPHRAGM VALVE
Filed May 12, 1960
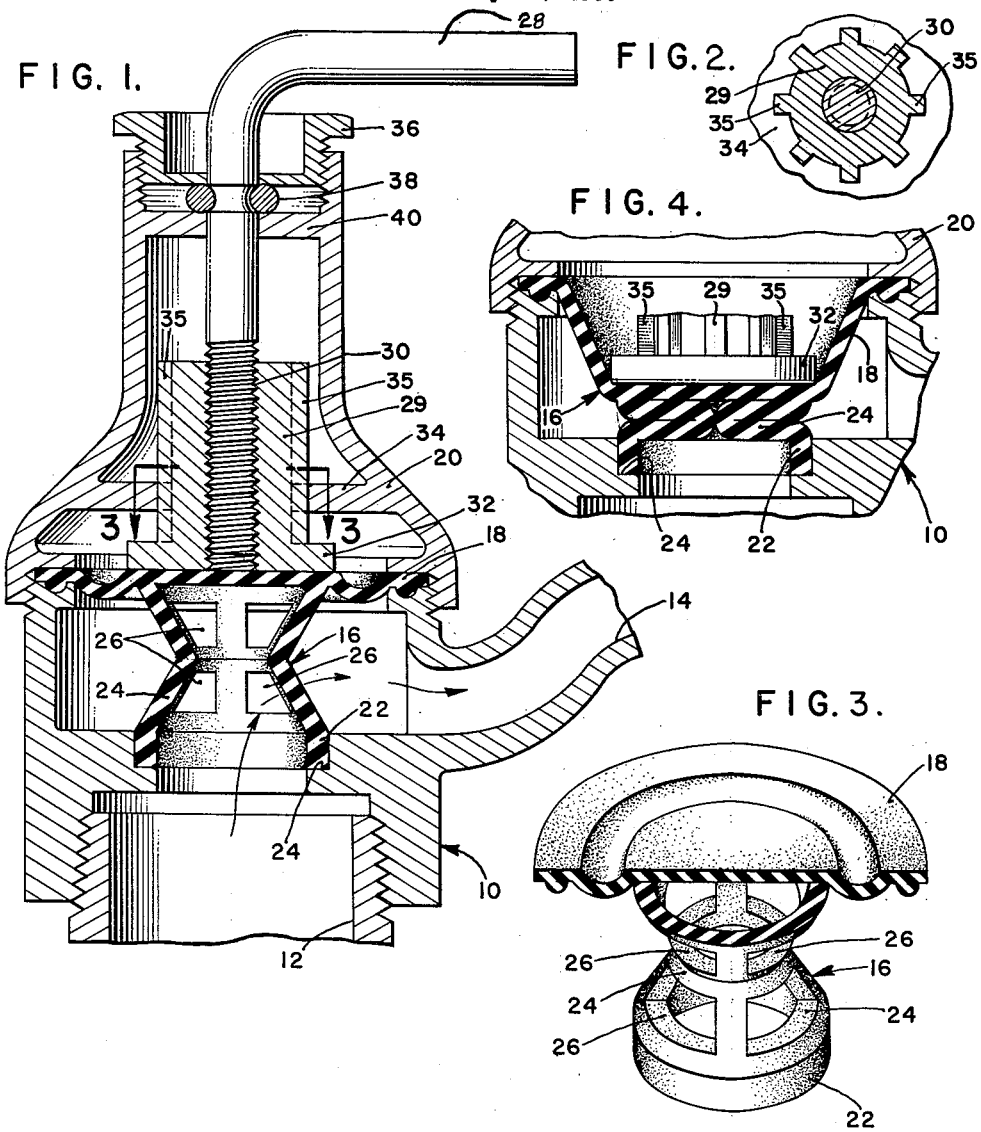
INVENTOR.
MYRON J. GLAUBER.
BY
ATTORNEYS.

United States Patent Office 3,095,905
Patented July 2, 1963

3,095,905
DIAPHRAGM VALVE
Myron J. Glauber, 6399 Wilshire Blvd.,
Los Angeles 48, Calif.
Filed May 12, 1960, Ser. No. 28,723
2 Claims. (Cl. 137—625.33)

This invention relates to an improved valve construction.

It is an object of this invention to provide a valve eliminating the customary valve seat susceptible to pitting, corroding or wire-drawing.

It is a further object of this invention to provide a valve wherein a seat washer is eliminated.

It is still a further object of this invention to provide a valve wherein the stem packing and its accompanying difficulties is eliminated.

It is still a further object of this invention to provide a valve having a simplified operating handle construction.

Still a further object is to prevent water wear on any threaded connection.

Still a further object is to eliminate the conventional screw which holds a valve handle to a stem.

Still a further object is to provide a valve unit which is removable from the valve body.

Other objects and advantages will be readily apparent from the following description:

In the drawings:

FIGURE 1 is a section through a valve embodying this invention.

FIGURE 2 is a view taken along line 3—3 of FIGURE 1.

FIGURE 3 is a perspective of the valve element.

FIGURE 4 is a section of the valve of FIGURE 1 in the closed position.

Referring to the embodiment of FIGURES 1, 2, 3 and 4 a housing 10 has an inlet pipe 12 screwed therein and an outlet spout 14. A resilient valve element 16 is interposed between the inlet and outlet.

This valve element has a flange 18 at its uppermost extremity which is clamped between bonnet 20 and housing 10. At the lower extremity the valve element has a segment 22 which seats in a suitable groove 24 in body 10.

Joining flange 18 and segment 22 is a central section 24 consisting of at least one accordion pleat having a series of windows 26 therein.

A valve actuating element 29 bears upon flanged portion 18 and moves up and down in accordance with the direction of rotation of handle 28 being connected thereto by screw threads 30. Upper travel of valve actuator 29 is limited by engagement of flange 32 thereon with internal flange 34 in bonnet 20. Upon downward travel of valve actuator 29 the valve element 16 and particularly the central section 24 thereof collapses or accordions so that flow therethrough is shut off as illustrated in FIGURE 5.

The actuator 29 has a plurality of keys 35 which fit into suitable grooves in flange 34 to prevent rotation of the actuator and facilitate positioning of handle 28 at the desired angle.

Handle 28 is retained in bonnet 20 by a nut 36 and split ring 38 that fits into a suitable groove in handle 28 and bears against an internal flange 40 in bonnet 20 thus preventing vertical movement of the handle during rotation.

The flange 18 of the valve element 16 functions to seal off any liquid from contacting the handle 29 or valve actuator 28 and also flexes to permit the desired accordion action to close the valve.

While what hereinbefore has been described as the preferred embodiment of this invention, it is readily apparent that alterations and modifications may be resorted to without departing from the scope of this invention and such alterations and modifications are intended to be included within the scope of the appended claims.

I claim:

1. A valve, comprising: a resilient valve element having a generally planar imperforate diaphragm portion; a generally tubular portion integral with and extending generally centrally and axially from one face of said diaphragm portion, said diaphragm portion extending radially outwardly beyond said tubular portion to provide a free-edged flange portion; a valve housing having a bonnet mounted thereon, said free-edged flange portion of said diaphragm being clamped between said housing and said bonnet; and openings in the side of said tubular portion between the ends thereof.

2. A valve as defined in claim 1 wherein said tubular portion is so configured that axial compression thereof causes the side of the same between the ends thereof to collapse radially whereby to block flow of fluid to or from the interior thereof through said openings.

References Cited in the file of this patent

UNITED STATES PATENTS

| | | |
|---|---|---|
| 660,193 | Loetzer | Oct. 23, 1900 |
| 2,540,298 | Seng | Feb. 6, 1951 |
| 2,869,571 | Price | Jan. 20, 1959 |
| 2,946,342 | Dopplmaier | July 26, 1960 |
| 2,964,289 | Schmitz | Dec. 13, 1960 |